United States Patent
Kawasaki

(10) Patent No.: US 9,870,184 B2
(45) Date of Patent: Jan. 16, 2018

(54) INFORMATION PROCESSING APPARATUS COMBINING MULTIPLE FILTERS, RECORDING MEDIUM, AND CONTROL METHOD

(71) Applicant: CANON KABUSHIKI KAISHA, Tokyo (JP)

(72) Inventor: Keiji Kawasaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/296,219

(22) Filed: Jun. 4, 2014

(65) Prior Publication Data
US 2014/0362405 A1 Dec. 11, 2014

(30) Foreign Application Priority Data
Jun. 7, 2013 (JP) .................. 2013-120717

(51) Int. Cl.
*G06F 3/12* (2006.01)
*G06F 17/21* (2006.01)

(52) U.S. Cl.
CPC .......... *G06F 3/1285* (2013.01); *G06F 3/1211* (2013.01); *G06F 3/1246* (2013.01); *G06F 3/1277* (2013.01); *G06F 17/21* (2013.01)

(58) Field of Classification Search
CPC ........ H04N 1/33307; G06F 2003/0697; G06F 3/1209; G06F 3/1228; G06F 3/1246; G06F 3/1248; G06F 3/1254; G06F 3/1298; G06F 9/5077; G06F 3/1225; G06F 3/1276; G06F 3/1277; G06K 15/1802; G06K 15/1827
See application file for complete search history.

(56) References Cited

U.S. PATENT DOCUMENTS

| | | | | |
|---|---|---|---|---|
| 2004/0111675 | A1* | 6/2004 | Mori ..................... | G06F 17/211 715/234 |
| 2008/0024802 | A1* | 1/2008 | Kato ..................... | G06F 3/1205 358/1.9 |
| 2008/0151294 | A1* | 6/2008 | Natori .................. | G06F 17/211 358/1.15 |
| 2008/0278741 | A1 | 11/2008 | Armstrong | |
| 2009/0290185 | A1* | 11/2009 | Shiohara ............... | G06F 3/1208 358/1.13 |

FOREIGN PATENT DOCUMENTS

| | | |
|---|---|---|
| CN | 101587429 A | 11/2009 |
| CN | 101652745 A | 2/2010 |
| CN | 102713829 A | 10/2012 |
| JP | 2009-282843 A | 12/2009 |

* cited by examiner

*Primary Examiner* — Henok A Shiferaw
(74) *Attorney, Agent, or Firm* — Canon U.S.A., Inc. IP Division

(57) ABSTRACT

There is provided an information processing apparatus including a first filter configured to merge first print setting information of a first hierarchical level and second print setting information of a second hierarchical level to generate and store third print setting information, wherein the second hierarchical level is lower than the first hierarchical level; and a second filter subsequent to the first filter configured to acquire the third print setting information stored in the first filter.

11 Claims, 14 Drawing Sheets

INFORMATION PROCESSING APPARATUS COMBINING MULTIPLE FILTERS, RECORDING MEDIUM, AND CONTROL METHOD

BACKGROUND

Field of the Disclosure

The present specification relates to an information processing apparatus, a recording medium, and a control method.

Description of the Related Art

In a printing system to generate a print command through a series of processes performed by multiple filters, each of the filters in the printing system modifies print data according to the specific role of that filter, and then passes the modified data to a subsequent filter. Thus, print data is passed from one filter to another filter, and during this process, the print data is edited by the filters as appropriate to produce a print command. In other words, each filter processes print data passed from a preceding filter.

Japanese Patent Laid-Open No. 2009-282843 discloses technology in which a preview filter following a layout filter acquires print setting information for each of multiple hierarchical levels after processing of the layout filter.

SUMMARY OF THE INVENTION

Assuming an environment in which, in order to identify second print setting information for output of a second hierarchical level which is a lower hierarchical level than a first hierarchical level, a first filter merges the second print setting information and first print setting information of the first hierarchical level. Also assumed is that the first filter transmits print setting information (first print setting information and second print setting information) before merging, to a subsequent second filter connected to the first filter. A case where the technology according to Japanese Patent Laid-Open No. 2009-282843 is employed in the assumed environment will now be considered. Japanese Patent Laid-Open No. 2009-282843 has not disclosed the above environment. Further, the print setting information before merging is passed to the second filter, so there is a concern that the second filter might merge the first print setting information and the second print setting information again, in the same way as the first filter, to identify the second print setting information for output of the second hierarchical level. Accordingly, such a configuration results in the first and second filters performing redundant processing, and consequently, there is a possibility that the processes of all of the filters will be delayed.

It has been found to be desirable to suppress delay in the processes performed by the filters as a whole.

An information processing apparatus according to the present specification includes: a first filter configured to merge first print setting information of a first hierarchical level and second print setting information of a second hierarchical level to generate and store third print setting information, wherein the second hierarchical level is lower than the first hierarchical level; and a second filter subsequent to the first filter, configured to acquire the third print setting information stored in the first filter.

Further features of the present invention will become apparent from the following description of exemplary embodiments with reference to the attached drawings.

DESCRIPTION OF THE EMBODIMENTS

Hereinafter, preferable embodiments of the present specification will be described in detail with reference to the appended drawings. Note that the following embodiments do not restrict the present invention according to the scope of Claims, and also all of combinations of features described in the embodiments are not necessarily essential in the solution proposed in the present specification.

Now, merge processing of print setting information will be described.

The processing load of a process to merge print setting information and match print settings may be heavy, depending on the configuration. Further, each filter has to perform merge processing of the print setting information, execute its own processing as appropriate, and then pass on parts including the print setting information to the subsequent filter when the process is completed.

Accordingly, if the merge process of the print setting information of the previous filter has not been completed, merge processing of the print setting information at the next filter is inhibited. Therefore, as the number of filters of the printing system increases, the processing time for the merge processing of the print setting information increases. Accordingly, there has been a problem that the time consumed from creation of print data up to actual start of the recording operation by a printer.

In one embodiment, the term "print settings" means information to be stored in a PrintTicket (PT) or DEVMODE structure. Also, although the PT will be described as print setting information hereinafter, the print setting information is not restricted to PT as long as the information includes print settings.

The present specification provides a method for reducing total processing time for merge processing of print setting information in a printing system having a configuration such as described above.

First Embodiment

Figure 1:
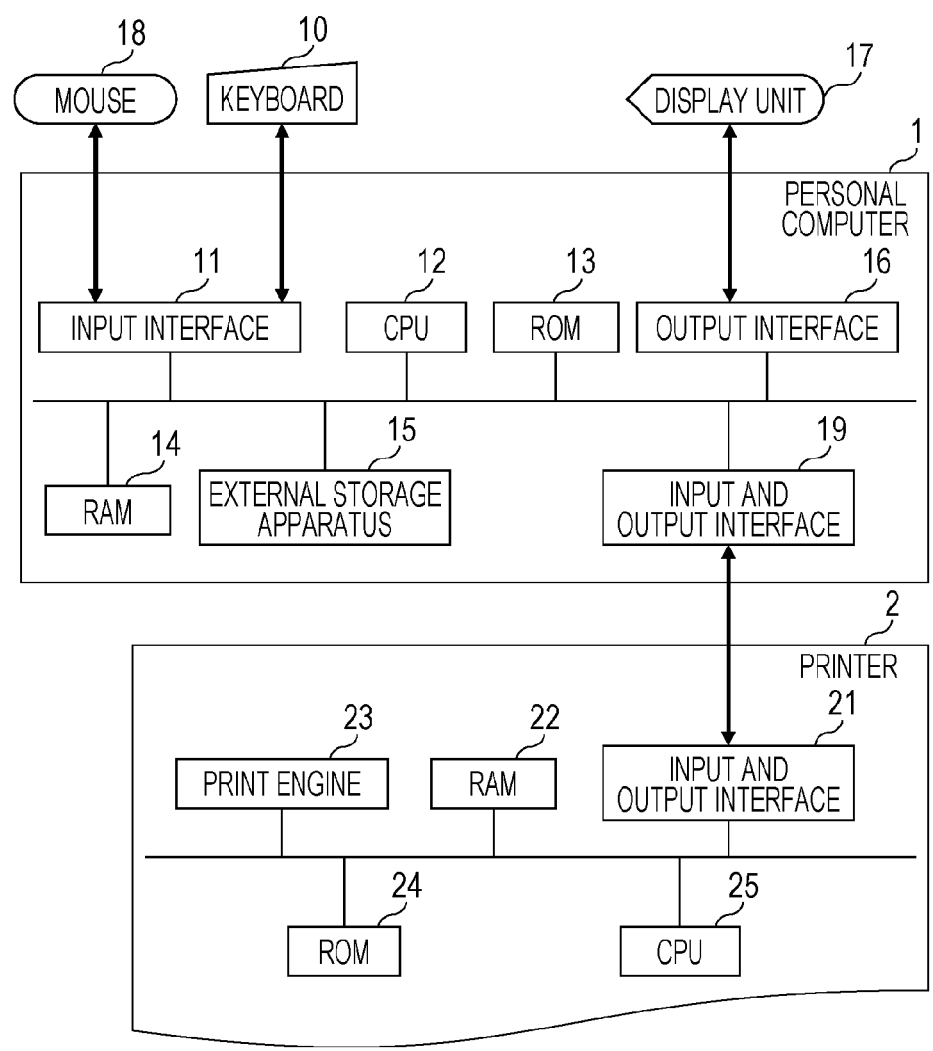
FIG. 1 is a block diagram of a printing system made up of a printer and an information processing apparatus.

FIG. 1 is an example of a block diagram conceptually representing the overall configuration of a printing system including a printer 2 and an information processing apparatus, for example, a personal computer 1, connected to the printer 2.

The personal computer 1 includes an input interface 11, a CPU 12, ROM 13, RAM 14, an external storage apparatus 15, an output interface 16, a display unit 17, a keyboard 10, a mouse 18, and an input and output interface 19. The ROM 13 stores an initialization program, and the external storage apparatus 15 stores an application program group, operating system (OS), a printer driver, and other various types of data. Various programs stored in the external storage apparatus 15 use the RAM 14 as work memory.

The printer 2 includes an input and output interface 21, RAM 22, a print engine 23, ROM 24, and a CPU 25. The input and output interface 21 is connected to the input and output interface 19 of the personal computer 1. The RAM 22 is used as the main memory and work memory of the CPU 25. The RAM 22 stores a reception buffer configured to temporarily store received print data, and various types of data. The print engine 23 performs printing based on the data stored in the RAM 22. The ROM 24 stores data that various control programs use. The CPU 25 controls the components of the printer 2 in accordance with these control programs.

Although the processing allocations of the personal computer 1 and print 2 are described as above, other processing allocations may be employed.

Figure 2:
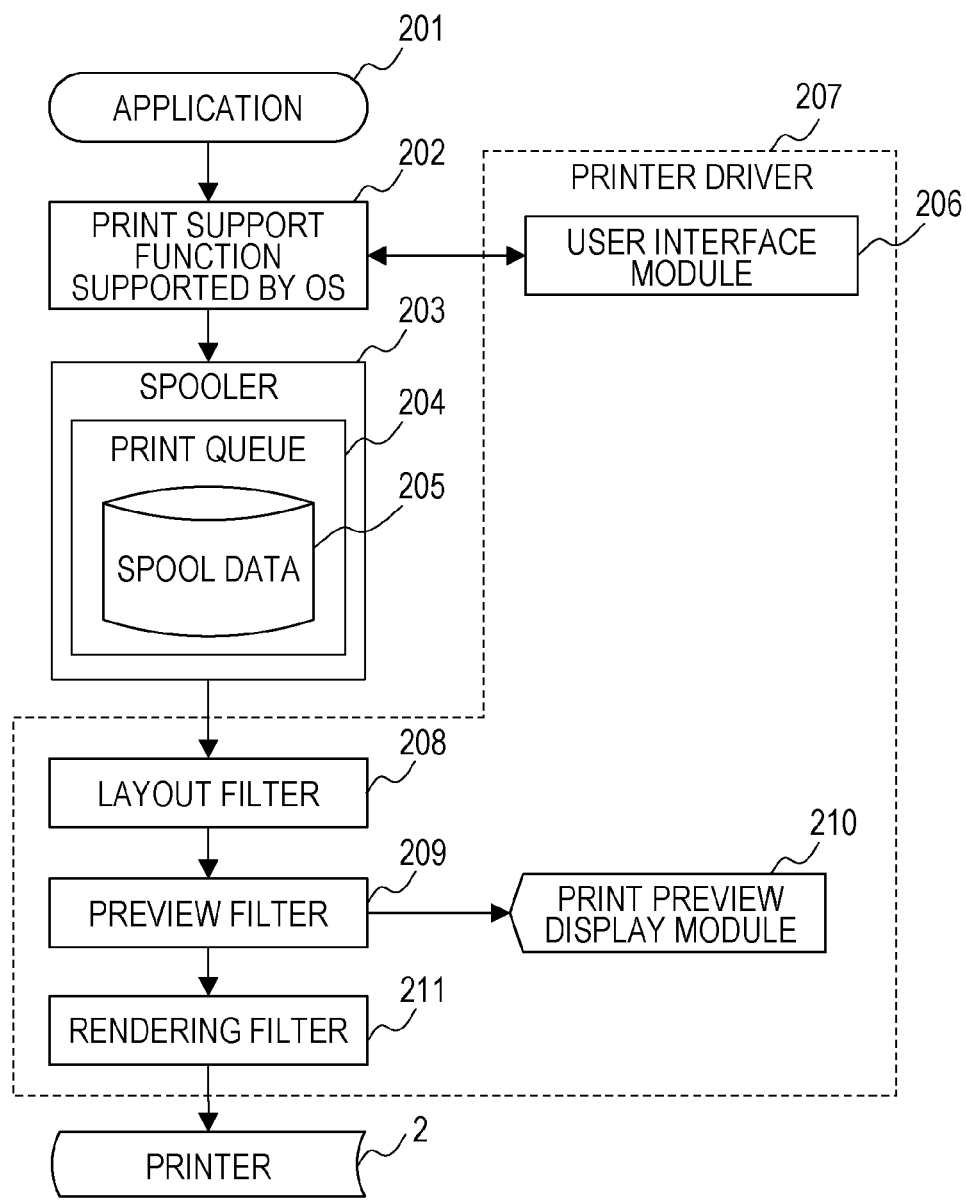
FIG. 2 is a block diagram illustrating the configuration of a printer driver.

FIG. 2 is a conceptual block diagram describing the exemplary configuration of a printer driver 207 according to the present embodiment. Hereinafter, description will be made regarding the printing system employing a general-purpose personal computer, Windows (a registered trademark of Microsoft Corporation) as the OS, and Extensible Markup Language (XML) Paper Specification (hereinafter, XPS), which is one of the which open-standard electronic document formats developed by Microsoft Corporation, as spool data.

Print data that an application 201 has created is temporarily stored as spool data 205 in a print queue 204 of a spooler 203 by a print support function 202 supported by the OS. The print data is converted into a print command that the printer driver 207 of the printer 2 can accept, and then supplied to the printer 2 for printing. The application 201 adds the print setting information returned from a user interface module 206 via the print support function 202 of the OS at the time of performing a print instruction to the print data. The print setting information is information set before performing the print start instruction from the application 201.

The print data passed to the printer driver 207 is first processed by a layout filter 208. The term "filter" here means a program having a function for outputting some sort of data via steps such as processing, conversion, generation, or the like based on the input data, which is called from a filter management function of the OS which is not illustrated. The layout filter 208 performs page configuration processing, such as rearrangement of pages of print data in accordance with the print setting information, compiling multiple pages into one page, or the like, on the print data. Next, the print data is passed to a preview filter 209. In the case that an instruction for displaying print preview information is included in the print setting information, the preview filter 209 calls up a print preview display module 210. The print preview display module 210 displays a print preview screen on the display unit 17 of the personal computer, and provides a unit configured to allow a user to confirm print results in advance.

Thereafter, in the case that the user has instructed printing from the print preview screen, the print data is spooled, and is processed at the layout filter 208. In the case that an instruction for displaying print preview information is not included in the print setting information, the preview filter 209 passes the print data to a rendering filter 211. The rendering filter 211 converts the print data into a print command that the printer 2 can accept, in accordance with the print setting information. The print commands that the rendering filter 211 outputs are sequentially transmitted to the printer 2.

Figure 10:
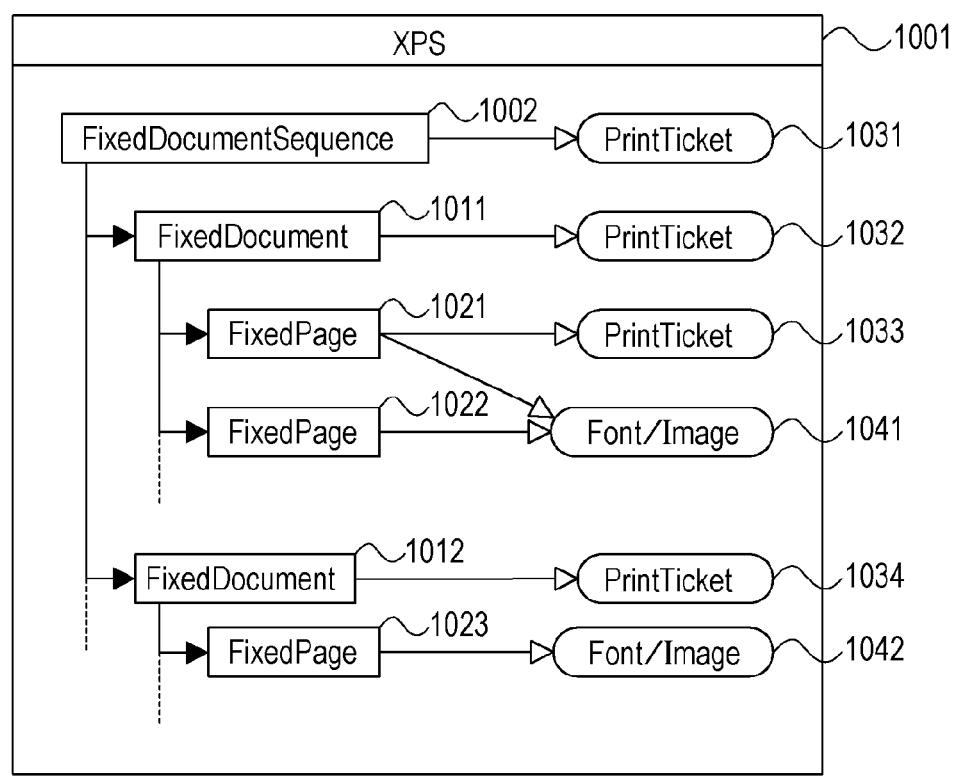
FIG. 10 is a block diagram illustrating a local structure of XPS document.

FIG. 10 is an exemplary block diagram illustrating a logical structure of XPS document 1001. The logical structure of the XPS document 1001 is a tree structure in which a FixedDocumentSequence (FDS) 1002 serves as the root. The FDS 1002 includes a FixedDocument (FD) 1011 and an FD 1012 as children (as lower hierarchical levels). The FD 1011 includes a FixedPage (FP) 1021 and an FP 1022. The FD 1012 includes an FP 1023 as a child. PTs in which print settings are described are as follows. The FDS 1002 holds a PT 1031, the FD 1011 holds a PT 1032, the FP 1021 holds a PT 1033, and the FD 1012 holds a PT 1034. The FPs 1022 and 1023 do not hold a PT. The FPs 1021 and 1022 share a resource 1041 such as a font or image or the like. The FP 1023 utilizes a resource 1042 such as a font or image or the like.

Here, a PT to be used at the time of printing the FP 1021 is a PT merged from an unshown user default PT, the PT 1031, PT 1032, and PT 1033. The term "merge" as used here indicates processing for uniting two PTs to generate one PT. Accordingly, in order to decide a PT to be used at the time of printing the FP 1021, merge processing needs to be performed three times. Normally, a merge includes a process for ensuring consistency between multiple print settings. This process is called "validation".

Figure 3:
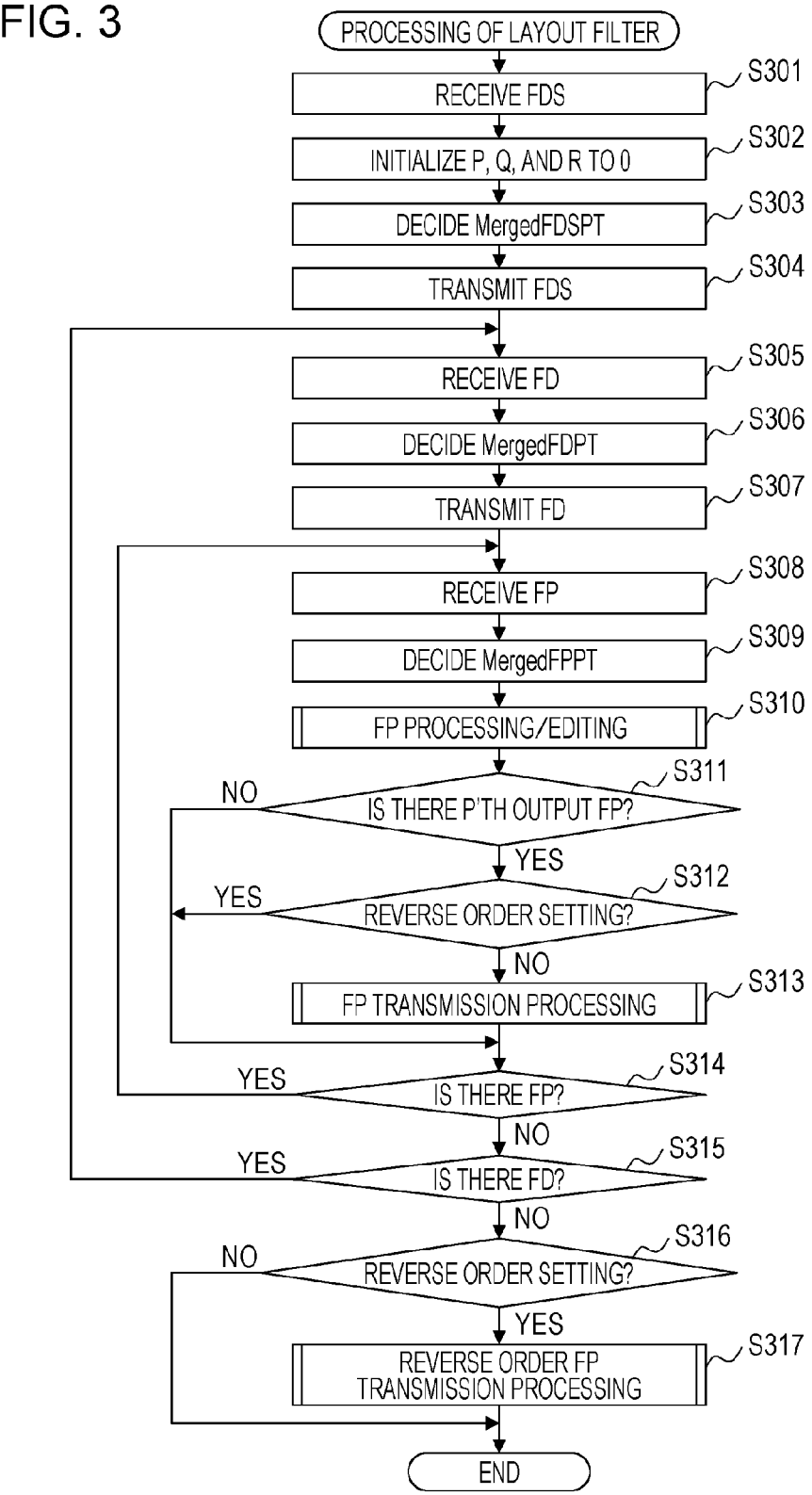
FIG. 3 is a flowchart illustrating processing of a layout filter.

As described above, XPS has a tree structure, and includes resources used for display and printing. FIG. 3 is a flowchart illustrating a process flow of the layout filter 208 according to the present embodiment. The flowchart in FIG. 3 includes the process flows of three modes of normal printing, layout printing (Nup printing), and reverse order printing, as representative processing of the layout filter 208. The layout filter 208 may also include, besides these, various types of processing relating to change in page configuration, and processing of page contents, such as booklet printing, stamp insertion processing, printing of multiple copies, and so forth.

The layout filter 208 first receives an FDS (S301). The filters call up an application programming interface (API) providing the filter management function of the OS that is not illustrated, thereby enabling the parts making up XPS documents to be received and transmitted. Next, the layout filter 208 initializes each of three variables of P, Q, and R to 0 (S302).

P denotes the number of processing pages, Q denotes the number of stored pages used for layout printing, and R denotes the number of transmitted pages used for reverse order printing.

Next, the layout filter 208 decides on an FDS hierarchical merged PrintTicket (MergedFDSPT) (S303). The layout filter 208 merges the user default PT, and PTs held by the FDS, thereby deciding on the MergedFDSPT. In the case that the FDS holds no PT, the layout filter 208 employs the user default PT as the MergedFDSPT. This merge processing is normally provided by the user interface module 206, with the caller calling up a particular API of the user interface module 206, thereby enabling the merge processing to be requested.

Next, the layout filter 208 transmits the FDS received in S301 (S304). The transmission of the FDS by the layout filter 208 enables the preview filter 209, which is the next filter, to receive the FDS. Although the filters can operate in parallel, it is difficult for the next filter to receive the FDS until the processing of the previous filter is completed and the FDS is transmitted. The same holds true for operations regarding the FDs and FPs as well.

Next, the layout filter 208 receives an FD (S305). Next, the layout filter 208 merges PTs held by the MergedFDSPT and FD, whereby a MergedFDPT is decided (S306). In the case that the FD holds no PT, the layout filter 208 employs the MergedFDSPT as the MergedFDPT. Next, the layout filter 208 transmits the FD (S307). Note that, since the lastly defined MergedFPPT is added to the FPs in the present specification, the layout filter 208 and subsequent filters do not have to reference FDs, depending on the configuration.

In this case, the processing in S307 may be changed as follows. Specifically, the layout filter 208 transmits only one fixed FD that has been prepared in advance following S304. Also, in the case that the layout filter 208 transmits the FD at the time of reverse order printing, the layout filter 208 does have to transmit the FD by inverting the order of FDs, but processing thereof is not a characteristic process in the present specification, and accordingly, this process is omitted from the flowchart.

Next, the layout filter 208 receives an FP (S308). Next, the layout filter 208 merges PTs held by the MergedFDPT and FP, thereby deciding on a MergedFPPT (S309). In the case that the FP holds no PT, the layout filter 208 employs the MergedFDPT as the MergedFPPT.

Next, the layout filter 208 performs processing for processing or editing the FP in accordance with the print settings of the MergedFPPT (S310). Details of the FP processing/editing are illustrated in the flowchart in FIG. 4, and description thereof will be described later. Upon the processing/editing of the FP being completed in S310, the layout filter 208 determines whether or not there is a P'th output FP (S311). The term "output FP" here means an FP for passing the FP that the layout filter 208 has processed/edited as appropriate, to the next filter. The layout filter 208 performs generation of this output FP as a single process in S310, which will be described later. In the case that there is an output FP in S311, the layout filter 208 confirms whether or not reverse order printing is specified in the MergedFPPT in the first page (S312). In the case that reverse order printing is not specified in S312, the layout filter 208 performs FP transmission processing (S313). Details of the FP transmission processing are illustrated in the flowchart in FIG. 5, and will be described later. In the case that there is no P'th output FP in S311, and in the case that reverse order printing is not specified in S312, the layout filter 208 skips the FP transmission process in S313.

The layout filter 208 determines whether or not there is a next FP (S314), and in the case that there is a next FP, repeats the processing in from S308 to S313. In the case that there is no next FP, the layout filter 208 determines whether or not there is a next FD (S315). In the case that there is a next FD, the layout filter 208 repeats the processing in from S305 to S314. In the case that there is no next FD, the layout filter 208 confirms whether or not reverse order printing is specified in the MergedFPPT in the first page (S316). In the case that reverse order printing is specified, the layout filter 208 performs the reverse order FP transmission processing (S317), and ends the process. Details of the reverse order FP transmission process are illustrated in the flowchart in FIG. 6, and will be described later. In the case that reverse order printing is not specified, the layout filter 208 does not perform the reverse order FP transmission processing, and ends the process.

Figure 4:
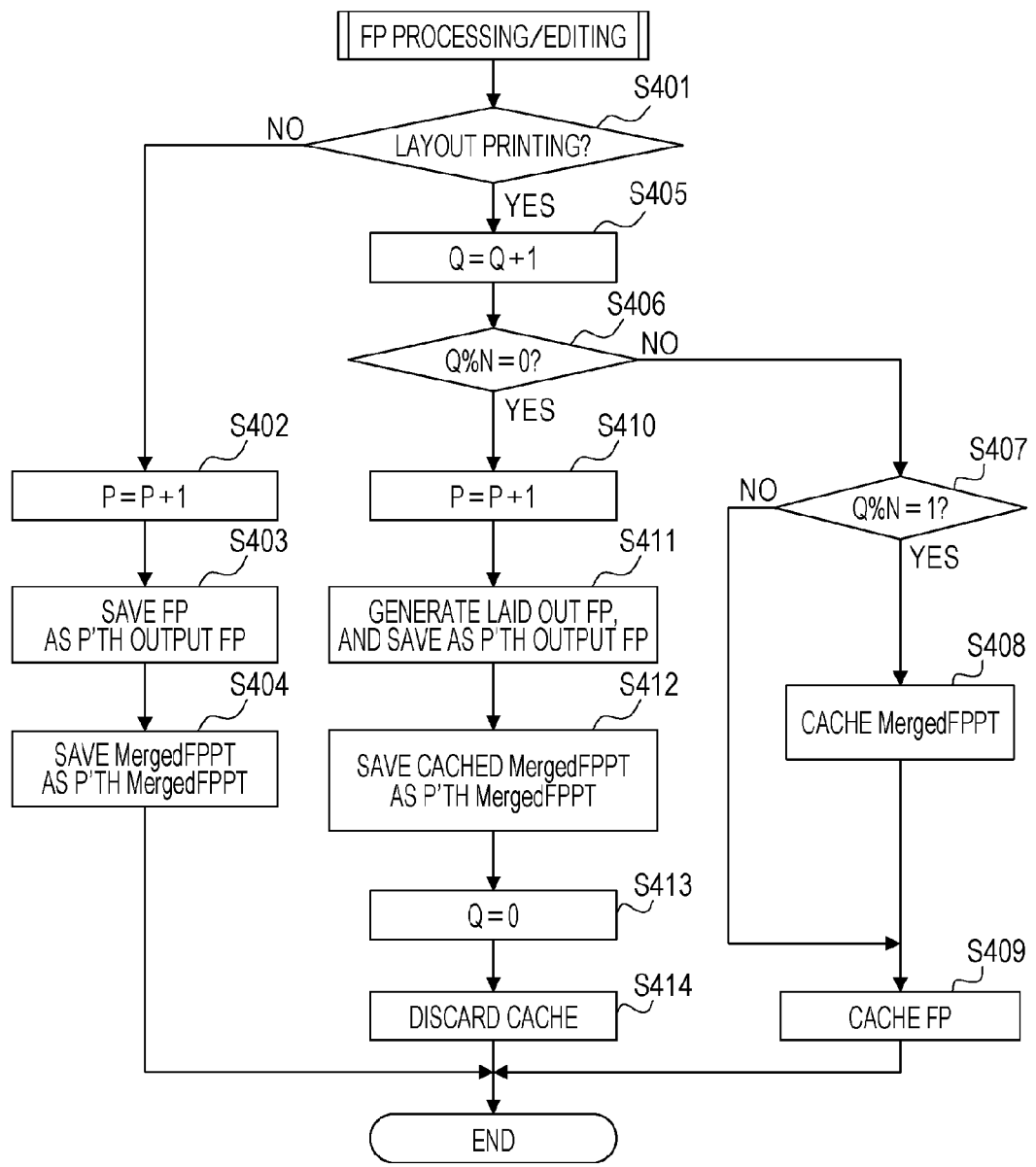
FIG. 4 is a sub flowchart illustrating FixedPage (FP) processing/editing of the layout filter.

FIG. 4 is a sub flowchart illustrating details of the FP processing/editing that the layout filter 208 performs in S310. The layout filter 208 confirms whether or not layout printing is specified in the MergedFPPT in the first page (S401).

In the case that no layout printing is specified, the layout filter 208 adds 1 to P (S402). Next, the layout filter 208 stores the current FP as the P'th output FP (S403). Further, the layout filter 208 stores the current MergedFPPT as the P'th MergedFPPT (S404). This ends the process of the layout filter 208 in the sub flowchart in the case that no layout printing is specified in S401.

In the case that layout printing is specified in S401, the layout filter 208 adds 1 to Q (S405). Next, the layout filter 208 determines whether or not a remainder obtained by dividing Q by N is 0 (S406).

Here, N denotes the number of layout divisions in layout print setting, and is specified in the MergedFPPT.

In the case that the determination in S406 is false, the layout filter 208 determines whether or not the remainder obtained by dividing Q by N is 1 (S407). In the case that S407 is true, the layout filter 208 temporarily caches the MergedFPPT (S408). After the process in S408, and in the case that S407 is false, the layout filter 208 temporarily caches the FP (S409). This ends the process of the layout filter 208 in the sub flowchart in FIG. 4 in the case that layout printing is specified in S401, and also S406 is false.

In the case that S406 is true, the layout filter 208 adds 1 to P (S410). Next, the layout filter 208 generates a layout-completed FP based on the current FP and the multiple FPs cached in S409, and stores it as the P'th output FP (S411). The layout-completed FP is created by reducing and performing placement of in-page objects in multiple FPs which serve as a source. Here, the PT held by the first FP before layout is added to the layout-completed FP created in S411. Further, the layout filter 208 stores the MergedFPPT cached in S408 as the P'th MergedFPPT (S412). The processes in S411 and S412 imply handling of the print settings of the first FP before layout, as the print settings of the FP after layout, in the case of performing layout printing.

Note that the layout filter 208 may be configured to decide the print settings of the FP after layout using another method. Specifically, the print settings of any one page of the first to the last pages of FPs for layout may be set as the print settings of the FP after layout, regardless of the print settings of the first FP.

Next, the layout filter 208 sets 0 as Q (S413). Lastly, the layout filter 208 discards the data cached in S408 and S409 (S414). This ends the process of the layout filter 208 in the sub flowchart in the case that layout printing is specified in S401, and also S406 is true.

Figure 5:
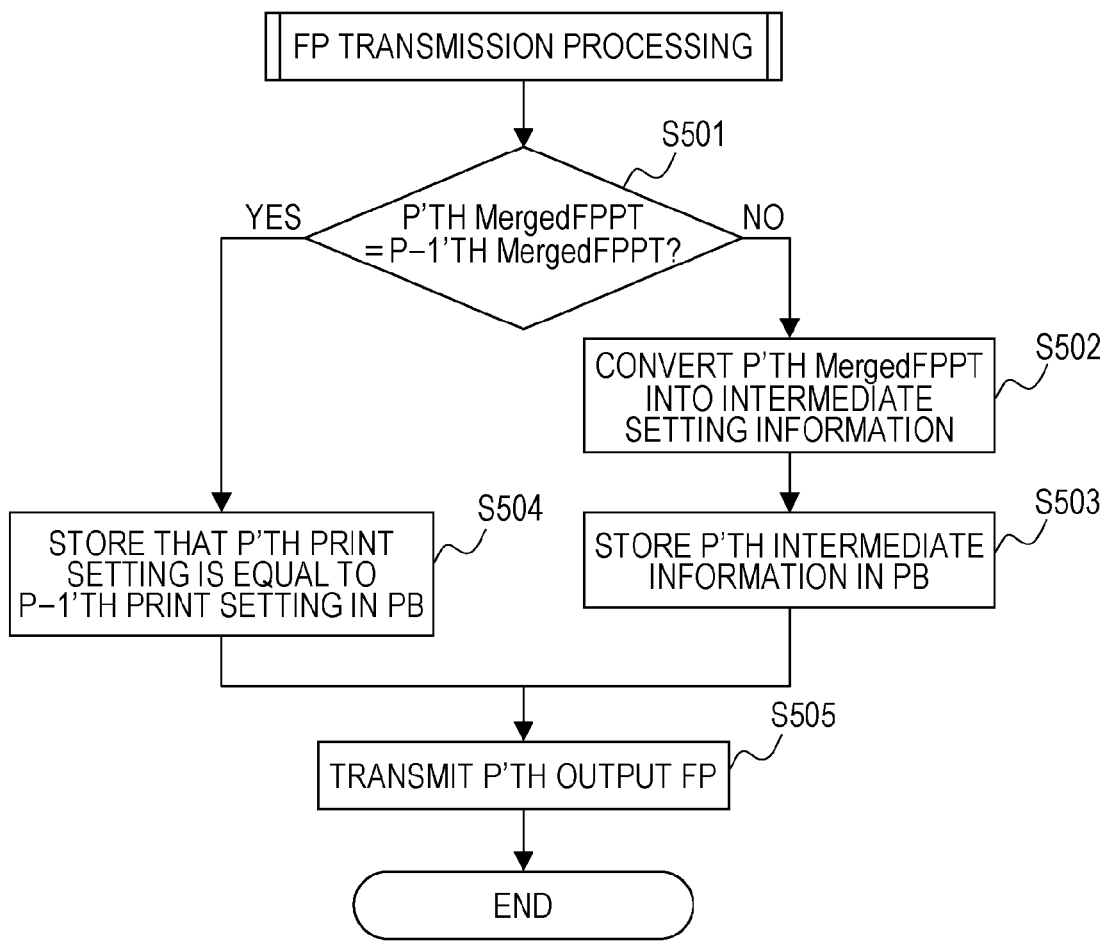
FIG. 5 is a sub flowchart illustrating FP transmission processing of the layout filter.

FIG. 5 is a sub flowchart illustrating details of the FP transmission processing that the layout filter 208 performs in S313. The layout filter 208 determines whether or not the P'th MergedFPPT is equal to the P-1'th MergedFPPT (S501). The layout filter 208 performs this determination processing based on the FDPT and FPPT that are sources of the MergedFPPT. For example, in the case that none of the consecutive FP1 and FP2, and FD1 which is a parent of FP1 and FP2, hold a PT, the layout filter 208 can logically determine that the merged print settings of the FP1 and FP2 are equal. Also, even when the FP1 and FP2 hold the same PT, the layout filter 208 can determine that the merged print settings of the FP1 and FP2 are equal. The layout filter 208 additionally performs determination regarding whether or not the PT held by a part which is being processed is equal to the PT held by the previous part (in the case of the FP, the FP one previous) in S306 and S309. Further, in accordance with this determination result, the layout filter 208 skips the merge processing if appropriate, and instead leaves information that the PT has not been changed from the previous part. The layout filter 208 can determine in S501, based on such information, whether or not the P'th MergedFPPT is equal to the P-1'th MergedFPPT.

In the case that S501 is false, the layout filter 208 converts the P'th MergedFPPT into the format of the DEVMODE structure which is later-described intermediate setting information 706 (S502). The DEVMODE structure is a structure for storing print settings. This conversion processing is normally provided by the user interface module 206. The caller calls up a particular API of the user interface module 206, thereby enabling this conversion processing to be requested. Next, the layout filter 208 registers the P'th later-described intermediate setting information 706 and updating information 707 in PropertyBag (PB) as the P'th data (S503). The PropertyBag here is a data management function provided from the filter management function of the OS which is not illustrated, and data is stored in the RAM 14 or external storage apparatus 15. All of the filters can store and acquire optional data to and from the PropertyBag.

Figure 7A:
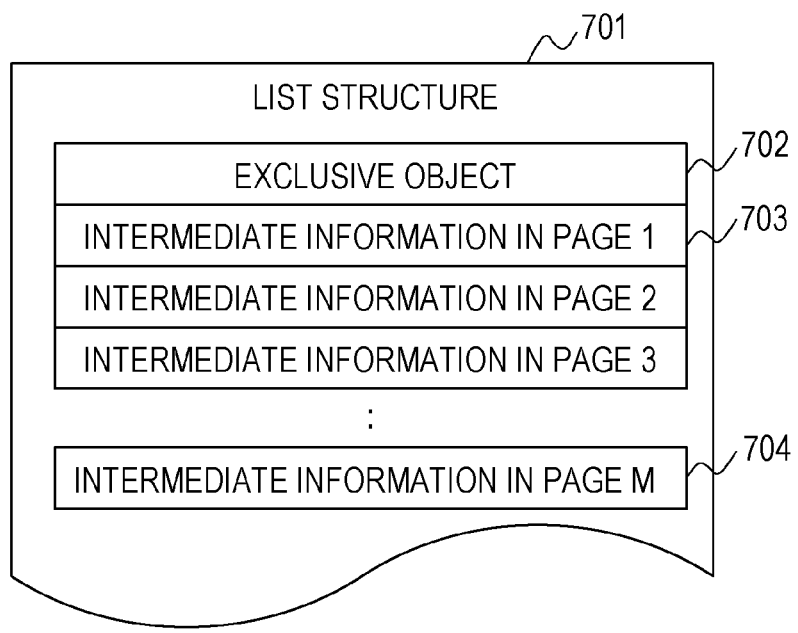
FIG. 7A is a block diagram illustrating the structure of print setting information to be stored in PropertyBag and FIG. 7B is a block diagram illustrating the structure of intermediate information.
Figure 7B:
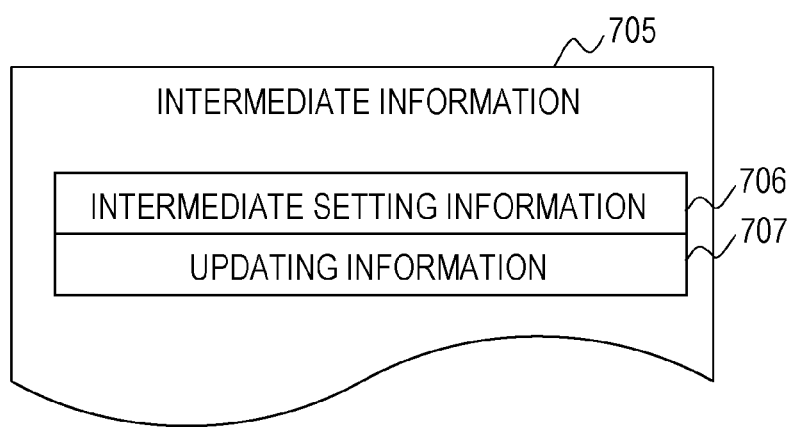

Here, the structure of information that the layout filter 208 stores in the PropertyBag is illustrated in FIGS. 7A and 7B. FIG. 7A is a list structure for storing intermediate information of multiple pages.

The intermediate information is information that is generated based on print setting information generated by merging print setting information. Note that the intermediate information is also one kind of print setting information in the sense that it is information relating to print settings.

Continuing description of FIGS. 7A and 7B, an exclusive object 702, and intermediate information 703 of Page 1 to intermediate information 704 of Page M, are stored in a list structure 701. The intermediate information of a job hierarchical level may be stored in the list structure 701 as appropriate. In order to suppress damage of data in the case of multiple threads accessing the list structure 701 at the same time, the exclusive object 702 is utilized so that processing from each of the threads is exclusive.

FIG. 7B illustrates the structure of the intermediate information 705. The intermediate information 705 is made up of intermediate setting information 706 and updating information 707. The intermediate setting information 706 stores the print settings of the format of the above DEVMODE structure. Information to be stored in the intermediate setting information 706 may be the format of a structure other than the PTs and DEVMODE. The updating information 707 stores the updating information from the intermediate setting information 706. For example, in the case that layout printing has been instructed in S401, the layout filter 208 lays out two pages in A4 size on one sheet of B5 size in accordance with the instruction contents, for example. In this case, the FP that the layout filter 208 creates in S411 has B5 as its size. Accordingly, the layout filter 208 and subsequent filters have to process this FP as the B5 size. In such a case, the layout filter 208 stores information indicating that the paper size has been changed to B5, in the updating information 707. The layout filter 208 may reflect the change in the intermediate setting information 706 instead of storing the change in the updating information 707.

Note that the entity of the intermediate information is stored in the memory with the structure in FIG. 7B, and the address on the stored memory space thereof is stored as the intermediate information of each page in the list structure 701. An address indicating one piece of the intermediate information may be stored as the intermediate information of a different page. Employing such a structure enabling the memory usage to be reduced, and also determining whether addresses are identical facilitates determination of whether the intermediate information is identical.

Returning to description of the flowchart in FIG. 5, in S503 the layout filter 208 creates or updates the list structure 701 and stores it in the PropertyBag. Further, the layout filter 208 stores the P'th intermediate setting information 706 and updating information 707 of the structure of the intermediate information 705 in the list structure 701. In the case that the P'th MergedFPPT is equal to the P-1'th in S501, the layout filter 208 stores that the P'th print settings are equal to the P-1'th (the previous page of the P'th) in the PropertyBag (S504). The layout filter 208 stores the address stored as the P-1'th intermediate information of the list structure 701 in the PropertyBag as the P'th intermediate information, thereby realizing the processing in S504.

After storing the information in the PropertyBag in S503 and S504, the layout filter 208 transmits the P'th output FP (S505). The FP that the layout filter 208 output can be received at the layout filter 208 and subsequent filters. Transmitting the FP after storing the intermediate information in the PropertyBag ensures that the intermediate information as to the FP thereof is stored in the PropertyBag at the timing when the subsequent filters receive this FP.

In the flowchart in FIG. 5, in the case that print settings are equal between consecutive pages, the layout filter 208 stores information thereof in the PropertyBag. Here, in the case that the print settings are equal, the layout filter 208 may store information thereof in the PropertyBag. In this case, memory usage can further be reduced.

Figure 6:
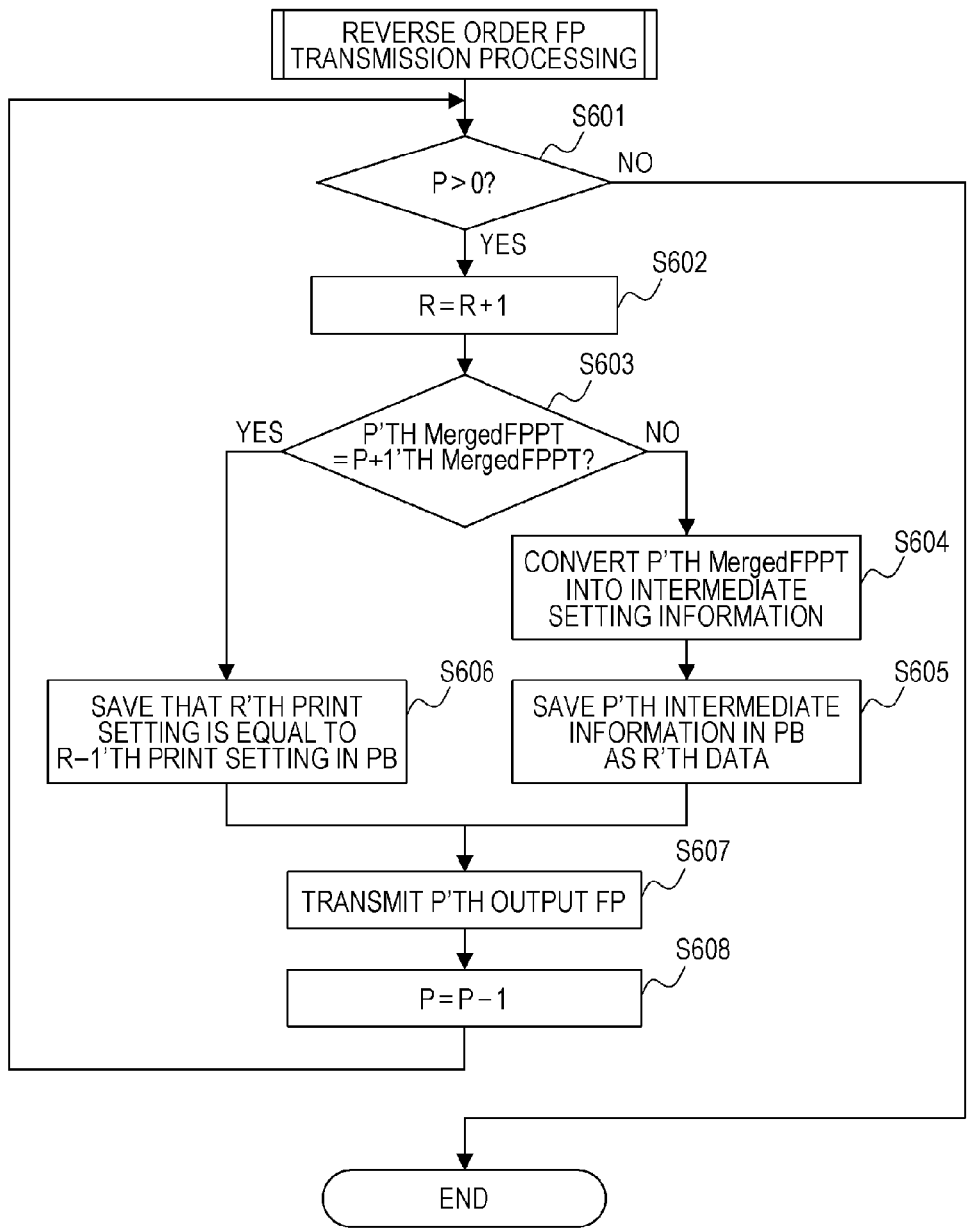
FIG. 6 is a sub flowchart illustrating reverse order FP transmission processing of the layout filter.

FIG. 6 is a sub flowchart illustrating details of the FP transmission processing at the time of reverse order setting that the layout filter 208 performs in S317. First, the layout filter 208 determines whether or not P is greater than 0 (S601). In the case that P is smaller than 0, the layout filter 208 ends the processing of the sub flowchart in FIG. 6. In the case that P is greater than 0, the layout filter 208 adds 1 to R (S602). Next, the layout filter 208 determines whether or not the P'th MergedFPPT is equal to the P+1'th MergedFPPT (S603). In the case that S603 is false, the layout filter 208 converts the P'th MergedFPPT into the format of the DEVMODE structure which is the intermediate setting information (S604). The processing in S604 is the same as the processing in S502. Next, the layout filter 208 registers the P'th intermediate setting information 706 and updating information 707 in the PropertyBag (PB) as the R'th data (S605). In the case that S603 is true, the layout filter 208 stores in the PropertyBag that the R'th print settings are equal to the R-1'th (S606). After storing the information in the PropertyBag in S605 and S606, the layout filter 208 transmits the P'th output FP (S607). Next, the layout filter 208 subtracts 1 from P (S608). Thereafter, the layout filter 208 returns to the processing in S601, and repeats the processing until S601 yields false. In the case that the reverse order print setting is thus specified, the layout filter 208 performs processing for inverting the order of the pages.

The layout filter 208 according to the present embodiment has been described so far with reference to the flowchart in FIGS. 3 to 6, dealing primarily with the characteristic operation. Note that, although layout printing and reverse order printing have been described in the present embodiment as a representative layout change process, it goes without saying that the present specification can also be applied to a case of implementing other page configuration change or page contents processing. In the case of having performed page configuration change or page contents processing, the layout filter 208 has to store the print settings in the PropertyBag to reference the intermediate information in accordance with the order and unit of the FP to be transmitted to the next filter.

In the flowcharts in FIGS. 3 and 5, the layout filter 208 stores the intermediate information in the PropertyBag in increments of pages. In the case that the subsequent filter references the MergedFDSPT or MergedFDPT, the layout filer 208 may be configured to store PTs thereof. In this case, the layout filter 208 stores the MergedFDSPT after S303, and stores the MergedFDPT after S306. In this case, the list structure in FIG. 7A has to be structured to store information of the FDS hierarchical level and FD hierarchical level.

Figure 8:
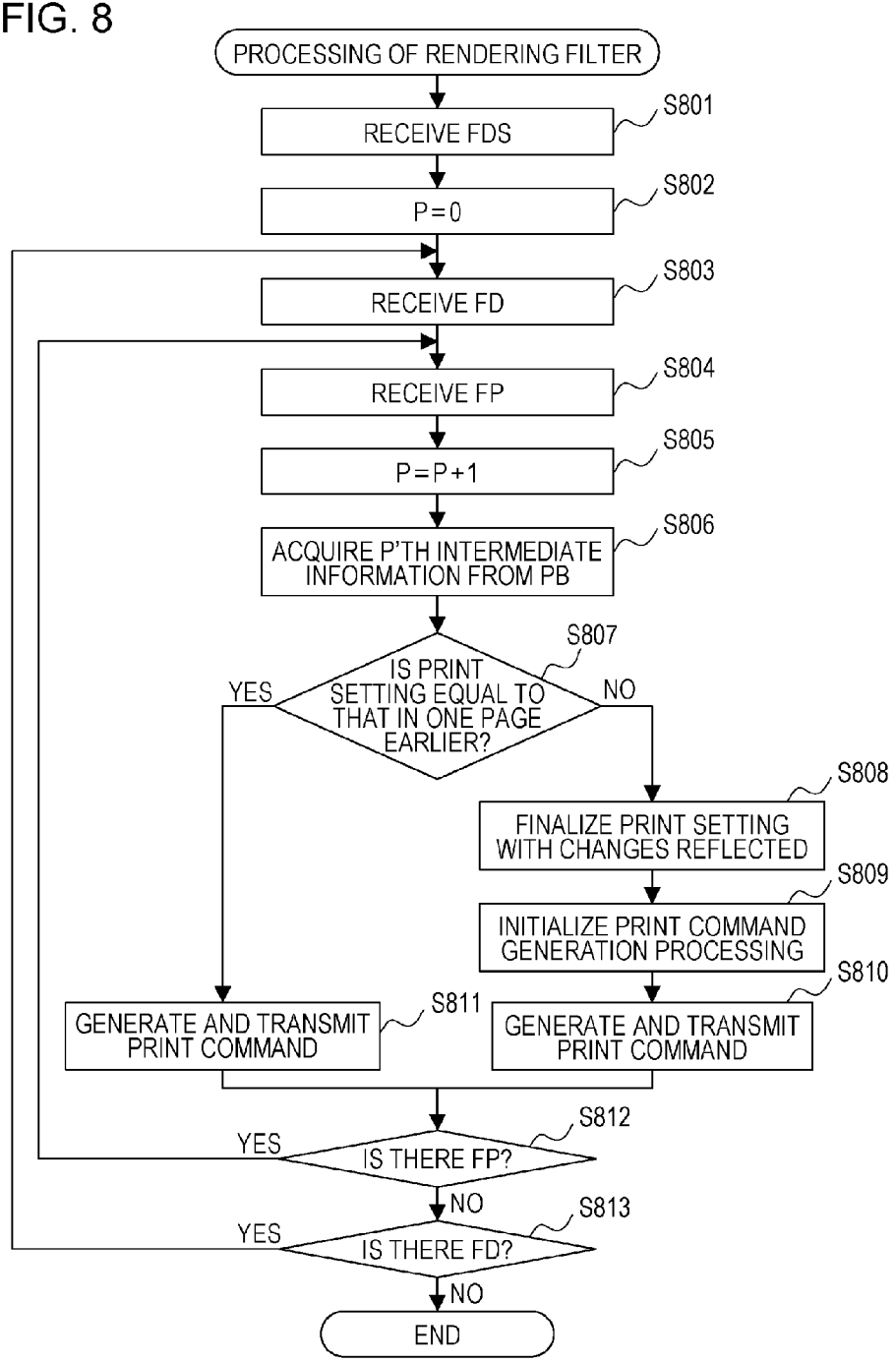
FIG. 8 is a flowchart illustrating processing of a rendering filter.

FIG. 8 is a flowchart illustrating the processing flow of the rendering filter 211 according to the present embodiment. First, the rendering filter 211 receives an FDS (S801). Next, the rendering filter 211 initializes P to 0 (S802). Next, the rendering filter 211 receives an FD (S803), and receives an FP (S804). Next, the rendering filter 211 adds 1 to P (S805). Next, the rendering filter 211 acquires the P'th intermediate information from the PropertyBag (S806). This intermediate information is information stored by the layout filer 208 in S503, S504, S605, and S606. Although not illustrated in the flowchart, in the case of having failed to acquire the intermediate information in S806, the rendering filter 211 acquires the PTs held by the received FDS, FD, and FP to decide print settings. Thus, even in the case of having failed to acquire the intermediation information due to some sort of trouble, the rendering filter 211 can continue the processing.

Next, the rendering filter 211 determines whether or not the acquired P'th intermediate information is equal to the intermediate information one page earlier (S807). This determination can be realized by determining whether or not addresses in the memory where the P'th intermediate information and P−1'th intermediate information are stored respectively are equal. In the case that S807 is false, the updating information stored in the intermediate information is reflected in the print settings of the format of the DEVMODE structure similarly stored in the intermediate information (S808). There is a possibility that inconsistency may occur between the print settings after having reflected the update, the rendering filter 211 also performs processing for removing inconsistency between the print settings as appropriate (S808). In the case that the print settings of the format of the DEVMODE structure has already been updated by the layout filter 208, the processing in S808 or part of the processing do not have to be performed. Next, the rendering filter 211 initializes the print command generating processing in accordance with the print settings (S809). This processing specifically includes initializing a rendering engine based on a print area and resolution decided in accordance with the print settings, and to transmit information to be used of the print settings to the printer 2, and so forth. Next, the rendering filter 211 generates and transmits a print command that the printer 2 can accept based on the FP (S810). In the case that S807 is true, that is, in the case that the P'th intermediate information is equal to the intermediate information one page earlier, the rendering filter 211 skips processing equivalent to S808 and S809, and generates and transmits a print command that the printer 2 can accept based on the FP (S811). In the case that the print settings have not been changed between S807 and S811, unnecessary processing can be prevented from occurring.

The rendering filter 211 determines in S812 whether or not there is a next FP, and in the case that there is a next FP, repeats the processing from S804 to S811. In the case that determination is made in S812 that there is no next FP, the rendering filter 211 determines in S813 whether or not there is a next FD, and in the case that there is a next FD, repeats the processing from S803 to S812. In the case that determination is made in S813 that there is no next FD, the rendering filer 211 ends the processing in the flowchart in FIG. 8. Those are the processes of the rendering filter 211 according to the present embodiment.

In the case that the merge processing is performed at each of the filters (handover of merged results (intermediate information) is not performed between the filters), the rendering filter 211 has to perform the merge processing of PTs more than once, such as the process in S309 that the layout filter 208 implements, or the like. However, according to the configuration of the present embodiment, the rendering filter 211 acquires merged intermediate information from the memory space, thereby enabling the PT merge processing to be omitted. Merging requires multiple processes, such as collection and validation of print settings after understanding the structure of a PT, and writing to the structure of a PT, and generally the processing load is great. Omitting the PT merge processing in the present embodiment enables the generation processing of print data to be performed at higher speed. Specifically, first, the amount of time from the application 201 starting printing to the printer 2 actually starting its printing operation, can be reduced. Further, the processing time per page in the case of the printer driver 207 processing multiple pages can also be reduced. It goes without saying that the preview filter 209 also can acquire intermediate information from the PropertyBag by omitting the PT merge processing in the same way as the rendering filter 211.

Figure 15A:
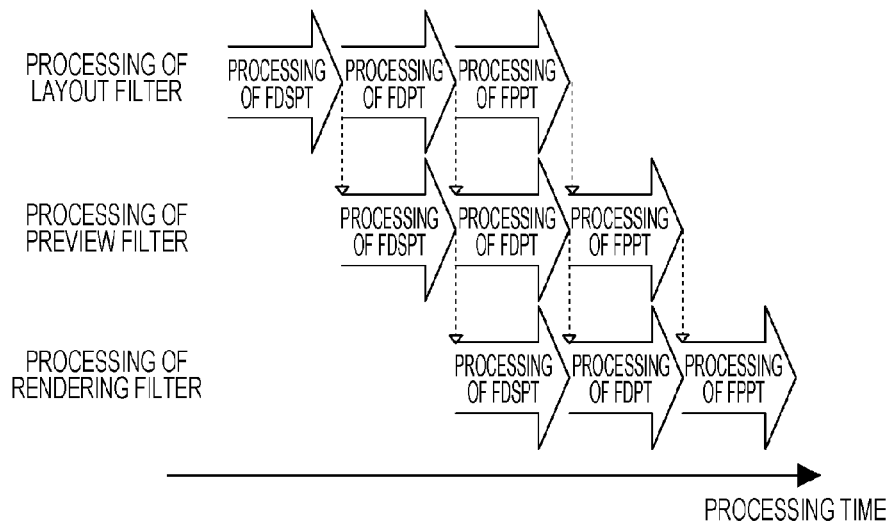
FIGS. 15A and 15B are block diagrams conceptually illustrating difference of processing time between processing according to the related art and the present specification.
Figure 15B:
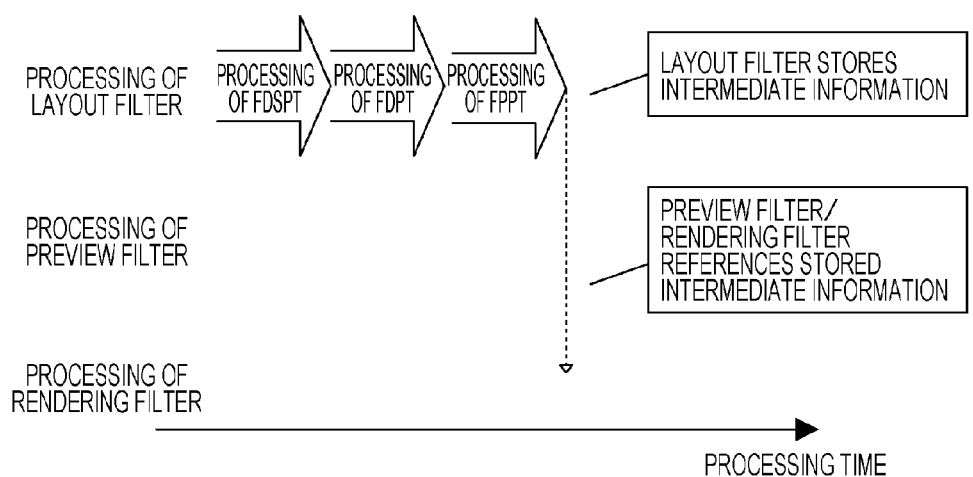

FIGS. 15A and 15B are diagrams conceptually illustrating reduction of print processing time according to the present configuration. FIG. 15A illustrates processing time in a configuration in which the merge processing is performed at each of the filters, and FIG. 15B illustrates processing time in the configuration of the present embodiment. Also, FIGS. 15A and 15B illustrate, in the case that the FDS, FD, and FP each hold a PT, processing until the print settings of the first page is determined by merging the PTs. The horizontal axis represents time that has elapsed, with time progressing to the right. In the case of the configuration in which each of the filters performs the merge processing, all of the filters have to implement the merge processing that the layout filer 208 implements in S303, S306, and S309. Further, if the processing of a PT of the previous filter is not completed, this hinders the next filter from processing that PT. Accordingly, as illustrated in FIG. 15A, the filters sequentially execute the merge processing three times, and consequently, this takes processing time equivalent to five rounds of execution of the merge processing in total. Note that, when operating the merge processing of three filters in parallel, more processing time is required than when independently operating each merge processing. On the other hand, the preview filter 209 and rendering filter 211 reference the results merged by the layout filter 208 in the present specification. Thus, the processing is ended at the processing time equivalent to three times of execution of the merge processing in total.

Also, although the printer driver 207 is configured including the three filters in the present embodiment, the configuration of the present specification can also be applied to a case where a printer driver is configured including two filters, or four or more filters. As the number of filters increases, the number of times of the merge processing of PTs, which is omissible, increases, and accordingly, the processing time can further be reduced. Also, in the case of the present embodiment, the layout filter 208, which is a filter in the initial position, performs the PT merge processing, and the storage processing to the PropertyBag. In the case of placing a filter which does not have to reference intermediate information at the initial position for some reason, a configuration may be made where the first filter of the subsequent filters which references intermediate information performs the PT merge processing, and the storage processing to the PropertyBag.

Note that description has been made so far regarding a case where intermediate information is generated at the layout filter 208 based on the FP. However, the configuration is not restricted to this, and an arrangement may be made in which the layout filter 208 sends the MergedFDPT to the subsequent filter as intermediate information, and the subsequent filter performs the merge processing on the MergedFDPT and FP, thereby obtaining the MergedFPPT. Alternatively, an arrangement may be made in which the MergedFPPT is stored as intermediate information without being converted into the DEVMODE.

Second Embodiment

The present embodiment employs a configuration in which the second filter and subsequent filters change print settings. Note that points not described in particular are the same as those in the first embodiment. A print preview display module 210 according to the present embodiment provides a user interface that allows the user to partially change print settings. Examples of changeable print settings include the type of paper.

Figure 9:
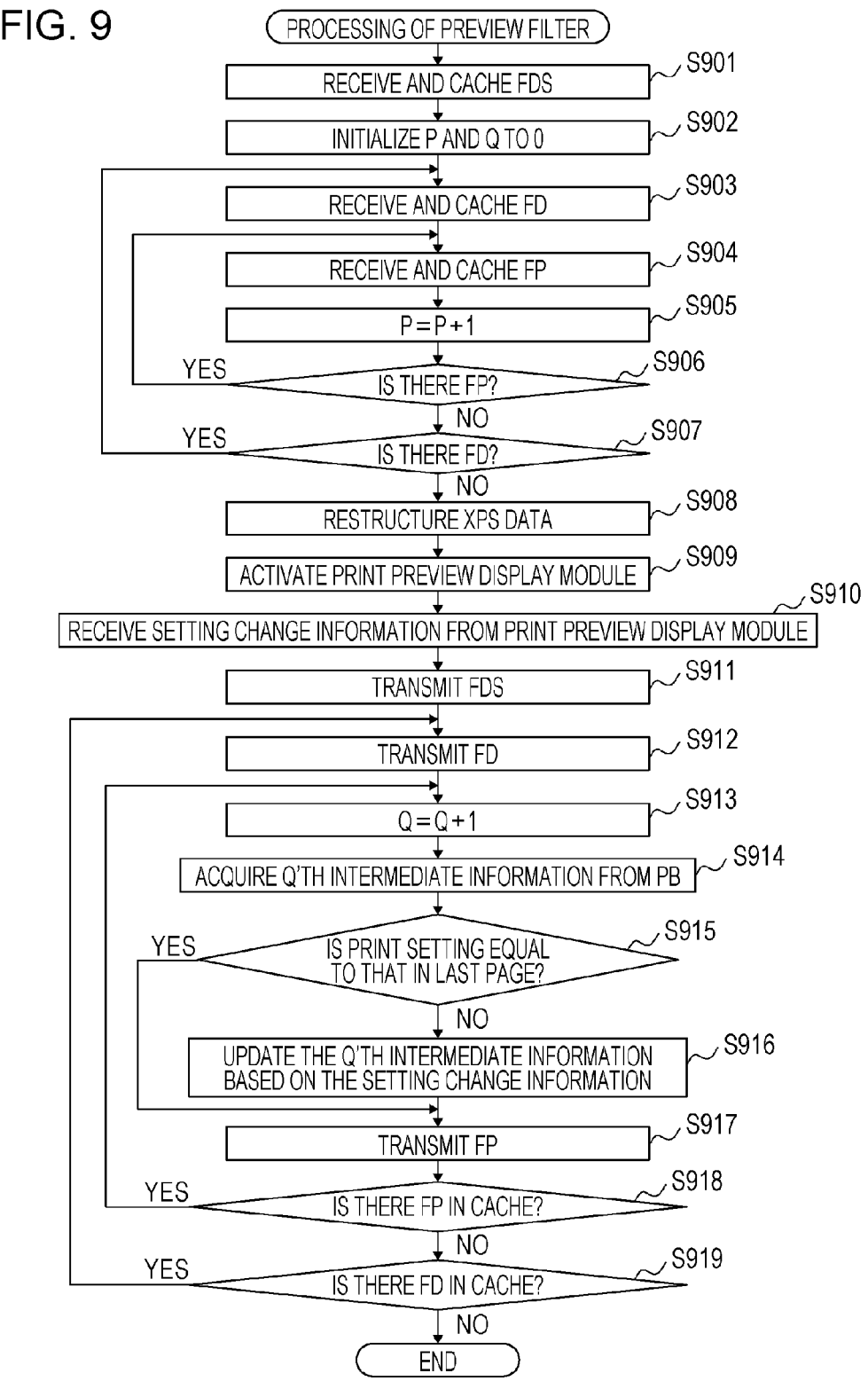
FIG. 9 is a flowchart illustrating of processing of a preview filter.

FIG. 9 is a flowchart illustrating the processing flow of the preview filter 209 configured to activate the print preview display module 210. First, the preview filter 209 receives an FDS, and caches it to reference later (S901). Next, the preview filter 209 initializes P and Q to 0, respectively (S902). Next, the preview filter 209 receives an FD, and caches it to reference later (S903). Next, the preview filter 209 receives an FP, and caches it to reference later (S904). Next, the preview filter 209 adds 1 to P (S905). Next, the preview filter 209 determines whether or not there is a next FP (S906), and in the case that there is a next FP, repeats the processing from S904 to S905. In the case that determination is made in S906 that there is no next FP, the preview filter 209 determines whether or not there is a next FD (S907), and in the case that there is a next FD, repeats the processing from S903 to S906.

In the case that determination is made in S907 that there is no next FD, the preview filter 209 performs reconfiguration of XPS data (S908). Specifically, the preview filter 209 generates the data in the XPS data format again based on the cached FDS, FD, and FP. The print preview display module 210 may implement this XPS data reconfiguration processing. Next, the preview filter 209 activates the print preview display module 210, and passes the reconfigured XPS data thereto (S909). Upon having received the XPS data, the print preview display module 210 displays a preview display area of the XPS data, and a user interface screen having a change area for print settings, which is not illustrated, on the display unit 17. During that time, the preview filter 209 awaits until the processing of the print preview display module 210 is completed. The user changes print settings on the user interface screen of the print preview display module 210. Hereinafter, the information of print settings changed by the user will be referred to as "setting change information". Next, upon the user having instructed a print start, the print preview display module 210 returns a response to the preview filter 209 along with the setting change information. Upon having received the setting change information from the print preview display module 210 (S910), the preview filter 209 transmits the cached FDS (S911). Next, the preview filter 209 transmits the cached FD (S912). Next, the preview filter 209 adds 1 to Q (S913). Next, the preview filter 209 acquires the Q'th intermediate information from the PropertyBag (S914). Next, the preview filter 209 determines whether or not the acquired Q'th intermediate information is equal to the intermediate information one page previous (S915). In the case that S915 is false, the preview filter 209 updates the Q'th intermediate information in the PropertyBag (S916). The preview filter 209 performs the updating based on the setting change information received from the print preview display module 210. After completion of the processing in S916, and in the case that S915 is true, the preview filter 209 transmits the FP (S917). Next, the preview filter 209 determines whether or not there is an FP in the cache which is a child of the FD transmitted in S912 (S918), and in the case that there is an FP, repeats the processing from S913 to S917. In the case that determination is made in S918 that there is no FP, the preview filter 209 determines whether or not there is a next FD in the cache (S919), and in the case that there is a next FD, repeats the processing from S912 to S918. In the case that determination is made in S919 that there is no next FD, the preview filter 209 ends the processing in the flowchart in FIG. 9.

As described above, in the case of the present embodiment, the preview filter 209 performs processing for updating intermediate information stored in the PropertyBag by the layout filter 208. Since the preview filter 209 transmits the FP after the updating processing of intermediate information is completed, it can be ensured that updating of the intermediate information has been completed at the timing when the rendering filter 211 receives the FP. Thus, in the case that multiple filters update intermediate information stored in the PropertyBag as well, the multiple filters transmit the FP after updating the intermediate information, thereby enabling correct processing to be performed without causing inconsistency between the FP that each filter receives and the print settings thereof. Note that the preview filter 209 may be configured to perform print setting changes whereby the page order or the number of pages is changed, such as an reverse order setting or layout setting, or the like. In this case, the preview filter 209 performs page editing or page order change processing. At this time as well, the preview filter 209 is configured to complete, before transmitting the FP, updating of intermediate information as to the FP thereof.

Third Embodiment

Description will be made in the present embodiment regarding a modification to pass print settings that the first filter has decided upon, to the subsequent filters using a method different from those in the first and second embodiments. Note that points not described in particular are the same as those in the second embodiment.

Figure 11:
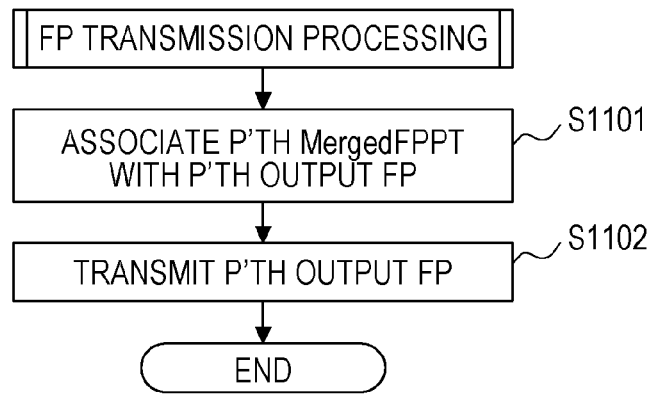
FIG. 11 is a sub flowchart illustrating FP transmission processing of a layout filter according to a third embodiment.

The basic processing flow of the layout filter 208 is the same as that illustrated in FIG. 3. FIG. 11 is a sub flowchart illustrating the FP transmission processing that the layout filter 208 implements in S313. First, the layout filter 208 associates the P'th MergedFPPT with the P'th output FP (S1101). Thus, an overwrite save of P'th MergedFPPT over the P'th FPPT is performed. Next, the layout filter 208 transmits the P'th output FP (S1102). This ends the FP transmission processing that the layout filter 208 implements in S313. There is no need to change the processing in the present embodiment depending on whether or not the P'th and P−1'th MergedFPPTs are equal, in contrast to the processing in S501 to S504. In the case that the layout filter 208 has associated the P'th and P−1'th FPs with the same MergedFPPT, the subsequent filters compare the acquired PTs, thereby enabling whether or not those are the same PT to be determined.

Figure 12:
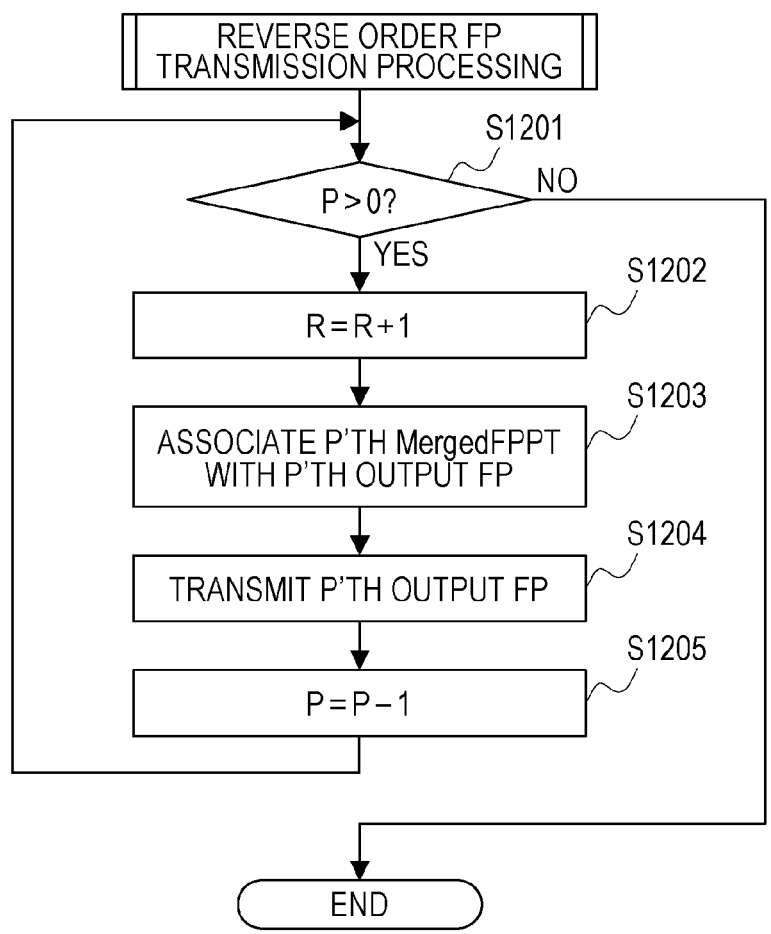
FIG. 12 is a sub flowchart illustrating reverse order FP transmission processing of the layer filter according to the third embodiment.

FIG. 12 is a sub flowchart illustrating the reverse order FP transmission processing that the layout filter 208 implements in S317. S1201 and S601 are the same processing, and S1202 and S602 are the same processing. After S1202, the layout filter 208 associates the P'th MergedFPPT with the P'th output FP (S1203). Thus, an overwrite save of P'th MergedFPPT over the P'th FPPT is performed. S1204 and S607 are the same processing, and S1205 and S608 are the same processing. This ends the reverse order FP transmission processing that the layout filter 208 implements in S317.

Figure 13:
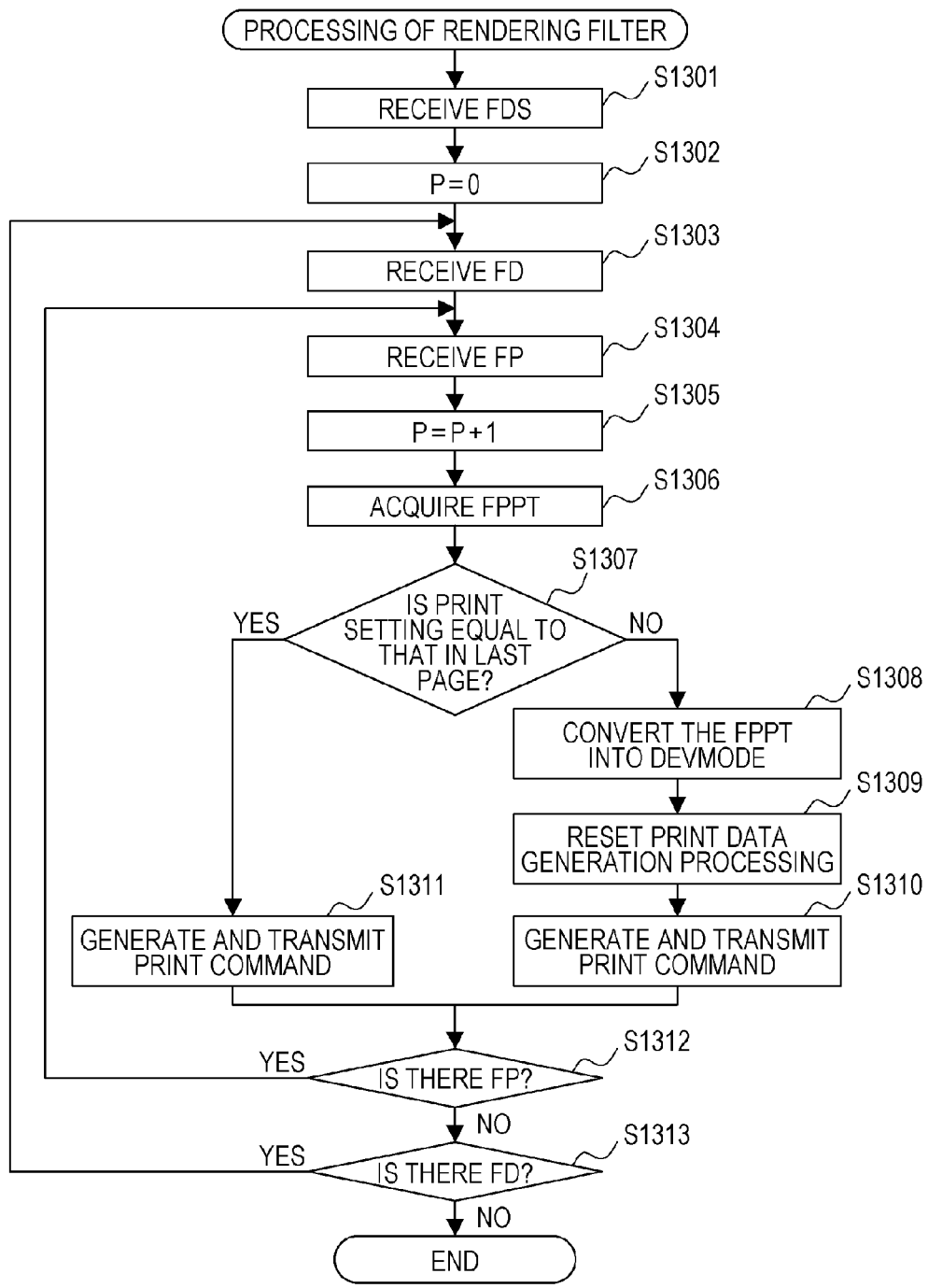
FIG. 13 is a flowchart illustrating processing of a rendering filter according to the third embodiment.

FIG. 13 is a flowchart illustrating the processing flow of the rendering filter 211 according to the present embodiment. The processes in S1301 to S1305 are the same processes as the processes in S801 to S805. After S1305, the rendering filter 211 acquires a PT held by the FP (S1306). This is the MergedFPPT added by the layout filter 208. S1307 is the same as S807. In the case that S1307 is false, the rendering filter 211 converts the PT acquired in S1306 into the DEVMODE (S1308). The processing in S1309 to S1313 is the same processing as the processing in S809 to S813. This ends the processing of the rendering filter 211.

Figure 14:
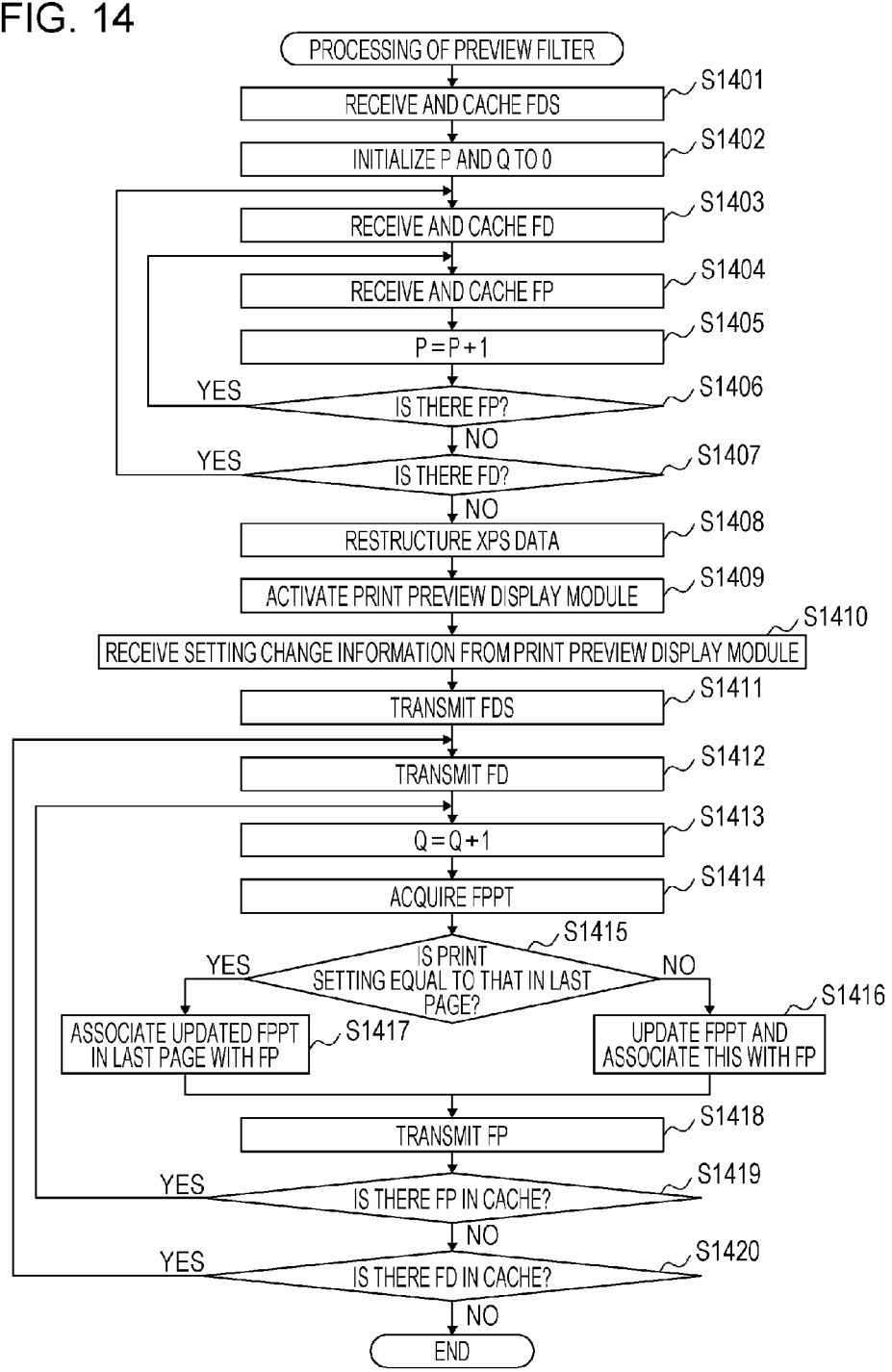
FIG. 14 is a flowchart illustrating processing of a preview filter according to the third embodiment.

FIG. 14 is a flowchart illustrating the processing flow of the preview filter 209 according to the present embodiment. The processing in S1401 to S1413 is the same processing as the processing in S901 to S913. After S1413, the preview filter 209 acquires a PT held by the FP (S1414). Next, the preview filter 209 determines whether or not the Q'th FPPT is the same FPPT one page previous (S1415). In the case that S1415 is false, the preview filter 209 updates the acquired PT, and associates this with the FP again (S1416). The preview filter 209 performs the updating based on the setting change information received from the print preview display module 210 in the same way as S916. In the case that S1415 is true, the preview filter 209 associates the updated PT of the previous page with the FP (S1417). The processing in S1418 to S1420 is the same processing as the processing in S917 to S919. This ends the processing of the preview filter 209 according to the present embodiment.

As described above, the layout filter 208 according to the present embodiment adds the MergedFPPT again as the PT of the FP instead of storing the MergedFPPT in the PropertyBag. The preview filter 209 and layout filter 208 skip the acquisition processing of the PT added to the FDS and FD, assuming that the MergedFPPT is added to the FP, and handles the PT added to the FP as the MergedFPPT. Thus, a situation wherein multiple filters redundantly perform PT merge processing can be avoided in the same way as the first and second embodiments, and the processing speed can be increased. Note that, although the layout filter 208 according to the present embodiment stores the MergedFPPT as the FPPT, the print settings converted into the DEVMODE may further be stored in the PT as binary, for example. Thus, a situation wherein multiple filters redundantly perform conversion processing to the DEVMODE can be avoided, and the processing speed can further be increased. Also, the MergedFPPT and DEVMODE may be stored in parts other than PTs and referenced.

Fourth Embodiment

It goes without saying that the functions of the above embodiments are achieved by supplying a recording medium in which the program code of software for realizing the functions of the above embodiments is recorded to a system or apparatus, and a computer (or CPU or MPU) of the system or apparatus reading and executing the program code stored in the recording medium. In this case, the program code itself read out from the recording medium realizes the functions of the above embodiments, and the recoding medium storing the program code thereof makes up the present specification.

Examples of the recording medium for supplying the program code include a flexible disk, hard disk, solid state drive (SSD), optical disc, magneto-optical disk, CD-ROM, CD-R, magnetic tape, nonvolatile memory card, ROM, and DVD.

Also, it goes without saying that the present specification includes a case where the computer executes the read program code, thereby realizing the functions of the above embodiments, and a case where the OS or the like which runs on the computer performs a part or all of the actual processes based on the instructions of the program code, and the functions of the above embodiments are realized by the processes thereof.

Further, it goes without saying that the present specification includes a case where the program code read out from the recording medium is written in memory included in a function expansion board inserted in the computer or a function expansion unit connected to the computer, following which, based on instructions from the program code thereof, a CPU or the like included in the function expansion board or function expansion unit thereof performs a part or all of the actual processes, and the functions of the above embodiments are realized by the processes thereof.

According to the preset specification, delay in the processes performed by the filters can be reduced as a whole.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-120717 filed Jun. 7, 2013, which is hereby incorporated by reference herein in its entirety.

What is claimed is:

1. An information processing apparatus executing a printer driver including a first filter and a second filter, comprising:
a memory; and
a processor in communication with the memory, the processor configured to control:
the first filter configured to receive data corresponding to a print target document of a hierarchical structure including a first hierarchical level and a second hierarchical level, generate, based on merging processing of merging first print setting information of the first hierarchical level and second print setting information of the second hierarchical level in the received data, merged print setting information, convert a format of the merged print setting information to generate intermediate information, and store the generated intermediate information in an area of a data management function provided from an operating system,
the second filter configured to receive the data after a process by the first filter for the print target document, skip the merging processing and acquire from the area the intermediate information stored by the first filter, and generate a print command based on the intermediate information, wherein the print command is used in a printing process of a printer.

2. The information processing apparatus according to claim 1, wherein the first filter is further configured to store intermediate setting information based on the print settings of the merged print setting information and update information relating to updating of the print settings of the merged print setting information, as the intermediate information.

3. The information processing apparatus according to claim 1, wherein the merged print setting information is provided per pages; and wherein, if a first merged print setting information of a first page is the same as a second merged print setting information of a second page preceding the first page, the first filter stores information indicating that the first merged print setting information is equal to the second merged print setting information without generating the intermediate information based on the first merged print setting information.

4. The information processing apparatus according to claim 1, wherein the first filter is configured to decide on print setting information of any one page of pages to be subjected to layout processing as print setting information after the layout processing if layout printing is instructed, and generates and stores the intermediate information based on the decided print setting information.

5. The information processing apparatus according to claim 1, wherein the first filter is further configured to merge third print setting information of a third hierarchical level, the first print setting information, and the second print setting information to generate and store the intermediate information, the third hierarchical level being lower than the second hierarchical level.

6. A control method comprising:
Receiving data, corresponding to a print target document, of a hierarchical structure including a first hierarchical level and a second hierarchical level which is higher than the first hierarchical level;
generating, based on merging processing of merging first print setting information of the first hierarchical level and second print setting information of the second hierarchical level in the received data, merged point setting information, convert a format of the merged print setting information to generate intermediate information,
storing the generated intermediate information in an area of a data management function provided from an operating system using a first filter; and
receiving the data after a process by the first filter for the printing target document, skipping the merging processing, and acquiring from the area of the stored the intermediate information stored by the first filter, and generating a print command based on the intermediate information, wherein the print command is used in a printing process of a printer.

7. The control method according to claim 6, wherein the first filter stores intermediate setting information based on the print settings of the merged print setting information and update information relating to updating of the print settings of the merged print setting information, as the intermediate information.

8. The control method according to claim 6, wherein the merged print setting information is provided per pages; and wherein, if a first merged print setting information of a first page is the same as a second merged print setting information of a second page which is the page preceding the first page, the first filter stores information indicating that the first merged print setting information is equal to the second print setting information, without generating the intermediate information based on the first merged print setting information.

9. The control method according to claim 6, wherein the first filter decides on the print setting information of any one page of pages to be subjected to layout processing as print setting information after the layout processing if layout printing is instructed, and generates and stores the intermediate information based on the decided print setting information.

10. The control method according to claim 6, wherein the first filter merges third print setting information of a third hierarchical level which is a lower hierarchical level than the second hierarchical level, the first print setting information, and the second print setting information to generate and store the intermediate information.

11. A non-transitory computer readable recording medium recording a program causing a computer to execute a control method, the control method comprising:
receiving, corresponding to a print target document, by using a first filter, data of a hierarchical structure including a first hierarchical level and a second hierarchical level which is a lower hierarchical level than the first hierarchical level;

generating, by using the first filter third print setting information based on merging processing of merging first print setting information of the first hierarchical level and second print setting information of the second hierarchical level in the received data, merged print setting information, and convert a format of the merged print setting information to generate intermediate information;

storing by using the first filter, the generated intermediate information in an area of a data management function provided from an operating system;

receiving, by using a first filter, the data after a process by the first filter for the print target document;

skipping the merging processing, acquiring by using a second filter from the area the intermediate information stored by the first filter, and generating a print command based on the intermediate information, wherein the print command is used in a printing process of a printer.

* * * * *